May 7, 1946.  C. JOHNSON  2,399,806
MACHINE TOOL CONTROL
Original Filed March 20, 1941   7 Sheets-Sheet 1

Inventor
CLARENCE JOHNSON
By Raymond D. Junkins
Attorney

May 7, 1946.  C. JOHNSON  2,399,806
MACHINE TOOL CONTROL
Original Filed March 20, 1941  7 Sheets-Sheet 2

Inventor
CLARENCE JOHNSON
By Raymond D. Jenkins
Attorney

May 7, 1946.                    C. JOHNSON                    2,399,806
                             MACHINE TOOL CONTROL
             Original Filed March 20, 1941      7 Sheets-Sheet 3
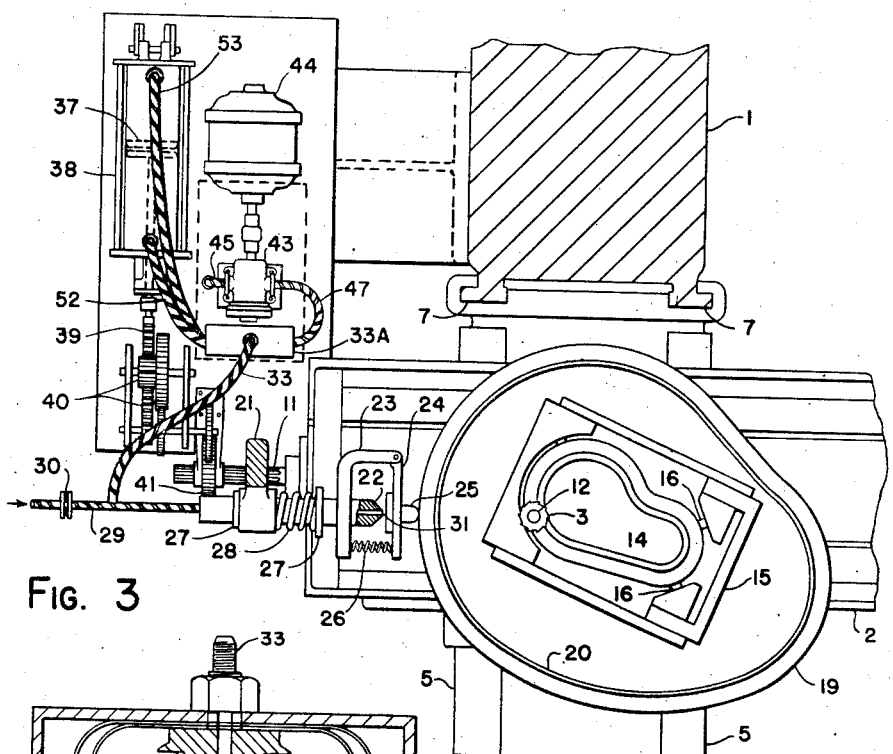
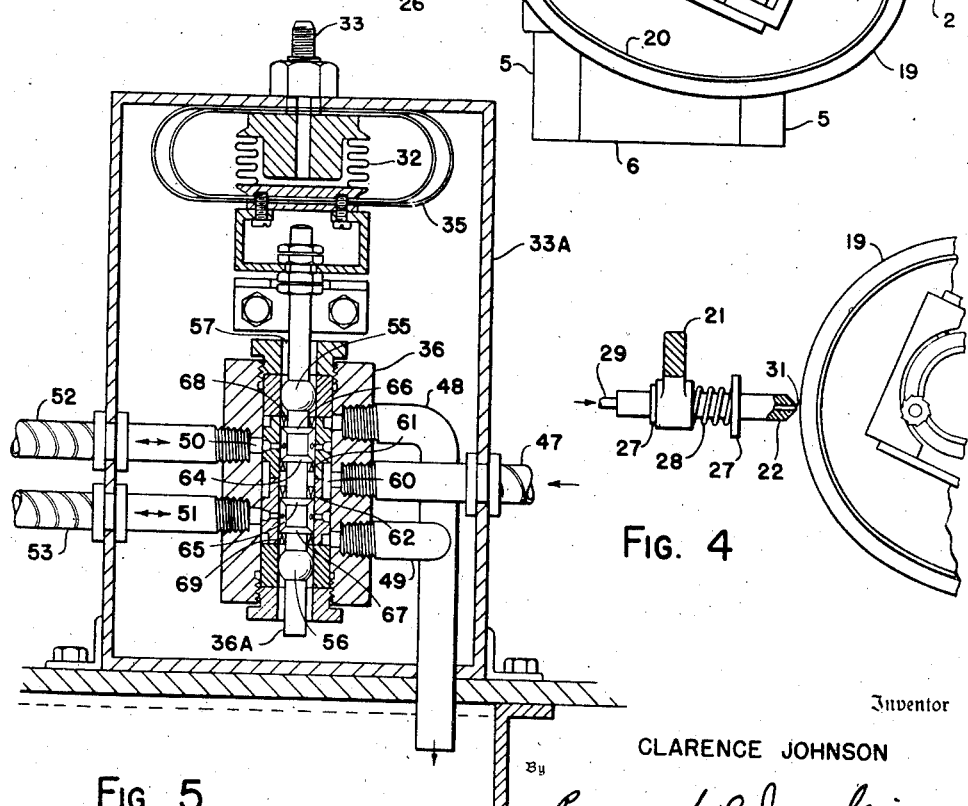
Inventor
CLARENCE JOHNSON
By Raymond D. Jenkins
        Attorney May 7, 1946.                    C. JOHNSON                    2,399,806
                            MACHINE TOOL CONTROL
                  Original Filed March 20, 1941    7 Sheets-Sheet 4

Inventor
CLARENCE JOHNSON
By
Raymond W. Junkins
Attorney

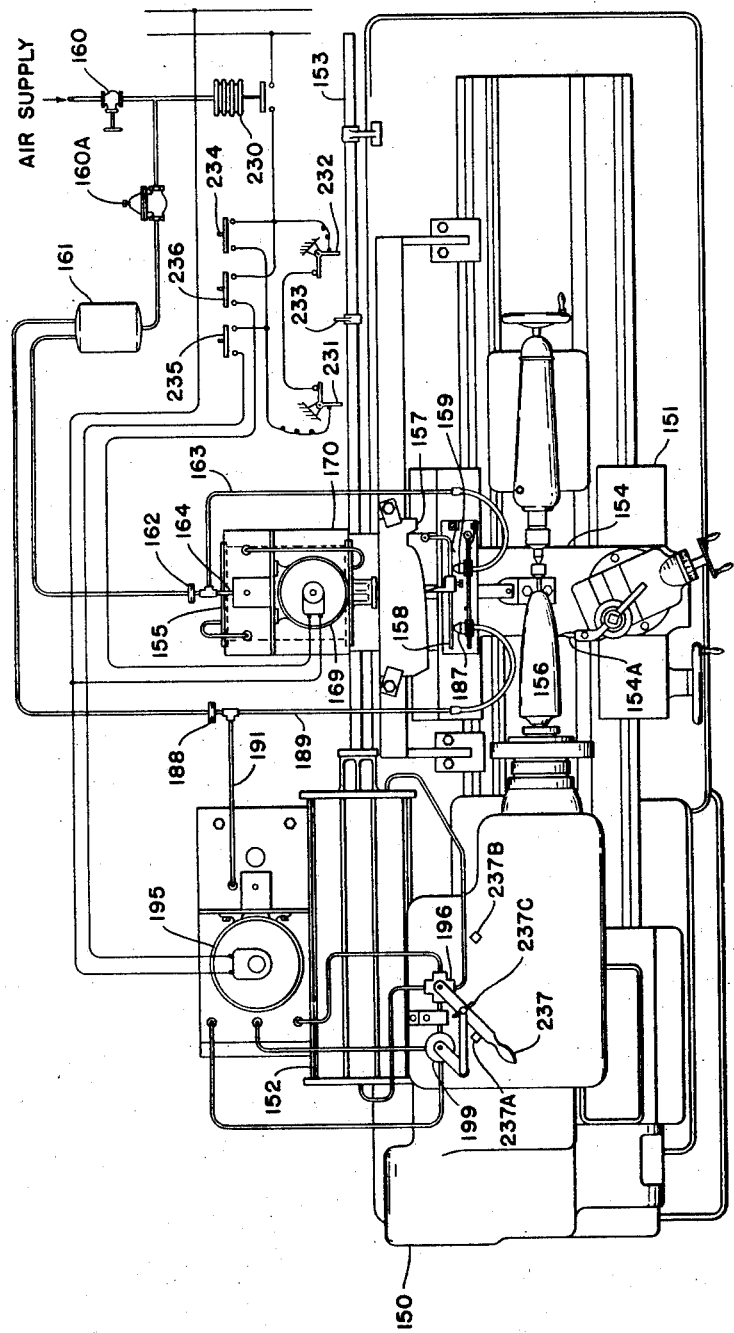

Inventor
CLARENCE JOHNSON
By Raymond W. Junkins
Attorney

May 7, 1946.  C. JOHNSON  2,399,806
MACHINE TOOL CONTROL
Original Filed March 20, 1941   7 Sheets-Sheet 7
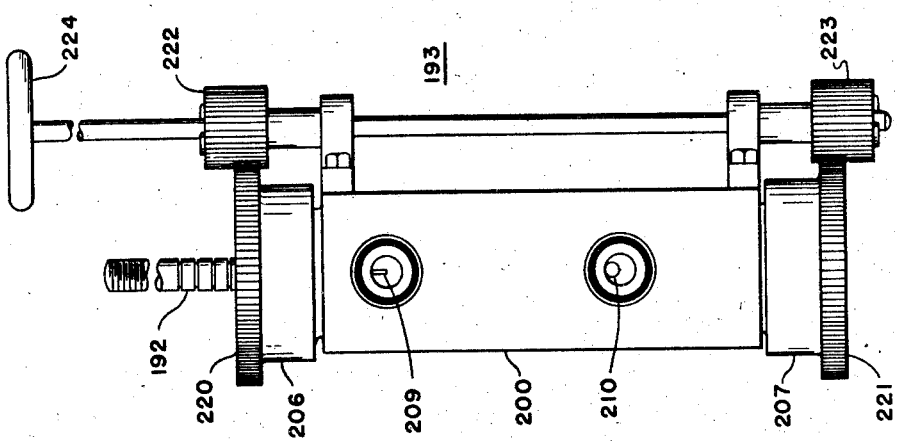
FIG. 14
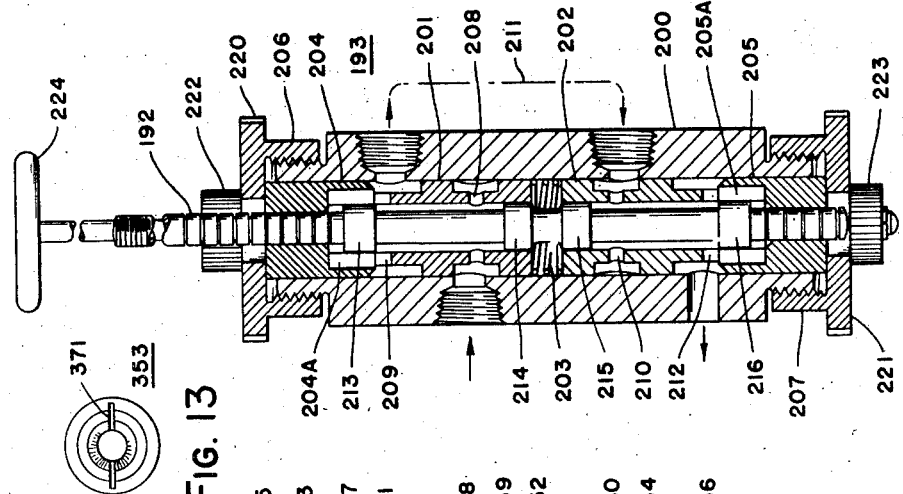
FIG. 13
FIG. 15
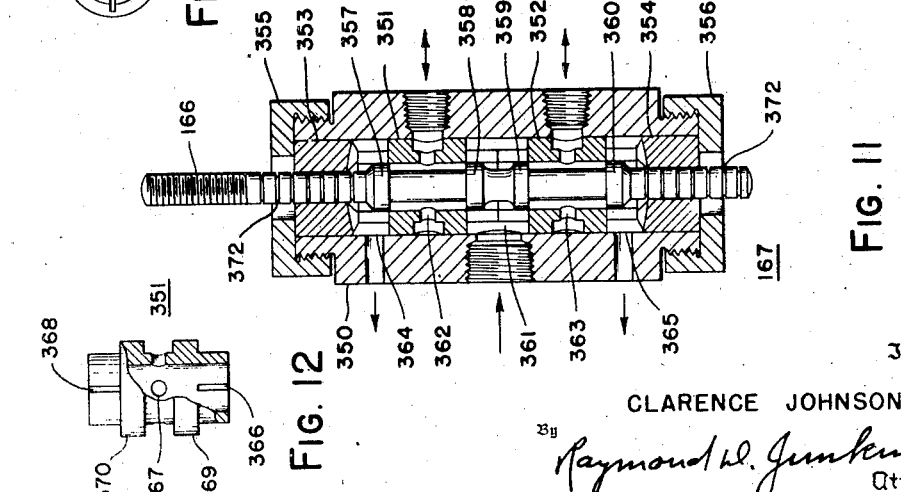
FIG. 12
FIG. 11
Inventor
CLARENCE JOHNSON
By Raymond W. Jenkins
Attorney Patented May 7, 1946

2,399,806

UNITED STATES PATENT OFFICE 2,399,806

MACHINE-TOOL CONTROL

Clarence Johnson, South Euclid, Ohio, assignor to Bailey Meter Company, a corporation of Delaware Original application March 20, 1941, Serial No. 384,375, now Patent No. 2,372,426, dated March 27, 1945. Divided and this application June 17, 1943, Serial No. 491,162

7 Claims. (Cl. 90—13.7)

This invention relates to duplicators for controlling the operation of a machine tool so that it forms a work piece to a contour or configuration determined by a template, pattern, or cam.

One of the objects of my invention is to improve the sensitivity of duplicators of the type described, and thereby increase the accuracy with which the work piece is formed.

A further object of my invention is to provide a duplicator of materially simpler construction than those now available.

A further object of my invention is to provide a duplicator employing no moving parts in the feeler mechanism scanning the template, pattern or cam.

In accordance with my invention the template, pattern or cam for producing the desired configuration of the work piece is scanned by a jet of fluid issuing from a nozzle, so that variations in the shape of the template, pattern or cam cause corresponding changes in the rate at which fluid is discharged from the nozzle, which changes in turn control the relative movement of the tool and work piece.

Further, in accordance with my invention the changes in the rate at which fluid is discharged from the nozzle effect corresponding variations in the pressure of the fluid in the nozzle, which latter variations are used to control the relative positioning of the tool and work piece.

Further, in accordance with my invention the changes in fluid pressure control the relative positioning of the tool and work piece through a hydraulic relay and servo-motor, to the end that ample power is available for accurately positioning the tool relative to the work piece.

Further, in accordance with my invention the relative rates of movement between the tool and work piece in two directions are simultaneously controlled, so that the rate of feed of the tool remains substantially constant regardless of changes in contour of the template, pattern or cam.

Further, in accordance with my invention separate and independent means are provided for controlling the rate of relative movement between tool and work piece in each direction.

Obviously, a duplicator of the type forming the subject matter of my invention may be employed with machine tools of various types, such as milling machines, lathes, slotters, planers, die-sinking machines and the like in which the relative feed between the tool and work may be suitably controlled. By way of example I will illustrate and describe my invention as applied to a few specific types of machine tools. Further applications and modifications of my invention will be readily apparent.

In the drawings:

Fig. 3 is a sectional view taken along the line 3—3 of Figs. 1 and 2 in the direction of the arrows.

Fig. 4 illustrates a modified form of nozzle scanning mechanism.

Fig. 5 is a cross-sectional view of a pilot valve for controlling the flow of fluid to and from a hydraulic servo-motor for regulating the relative feed of the tool and work piece.

Fig. 9 is a plan view of an engine lathe illustrating the application of a modified form of my invention thereto.

Fig. 11 is a cross-sectional view of one form of pilot valve employed in the power unit.

Fig. 12 is an elevation view of a sleeve element of the pilot valve shown in Fig. 11.

Fig. 13 is an end view of a bearing element of the pilot valve shown in Fig. 11.

Fig. 14 is an elevation view and Fig. 15 a cross-section view of another form of pilot valve which may be incorporated in the power unit.

Figure 1:
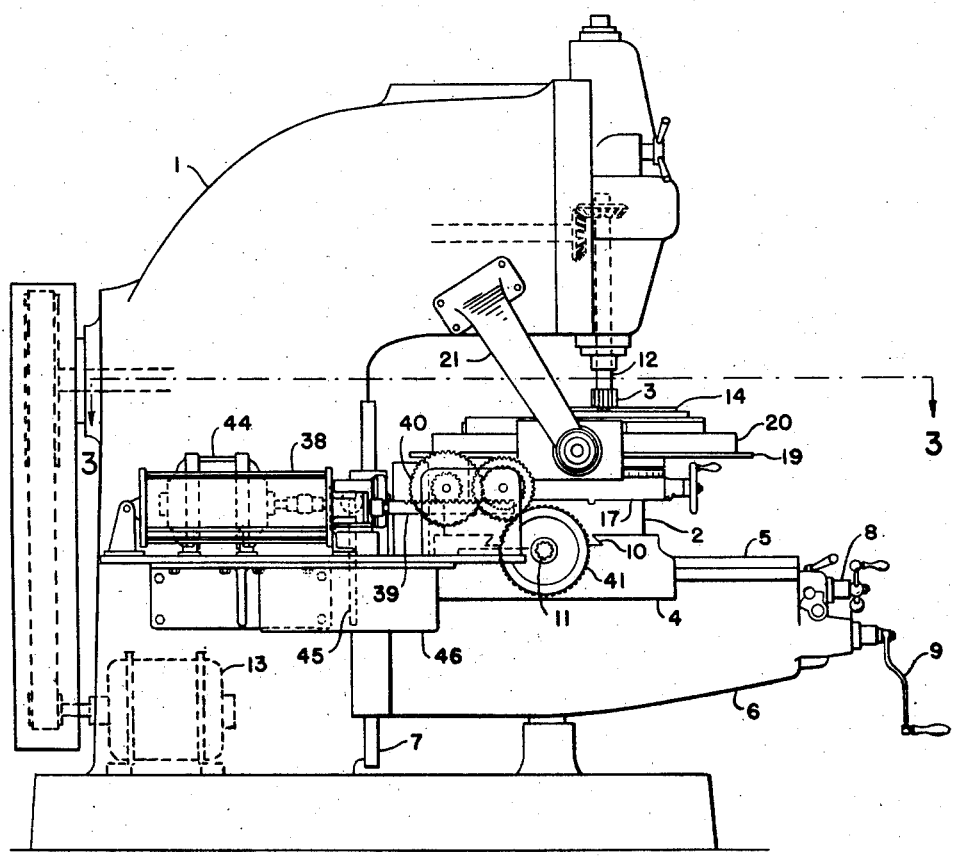
Fig. 1 is a side elevation and Fig. 2 is a front elevation of a vertical milling machine illustrating the application of my invention thereto.
Figure 2:
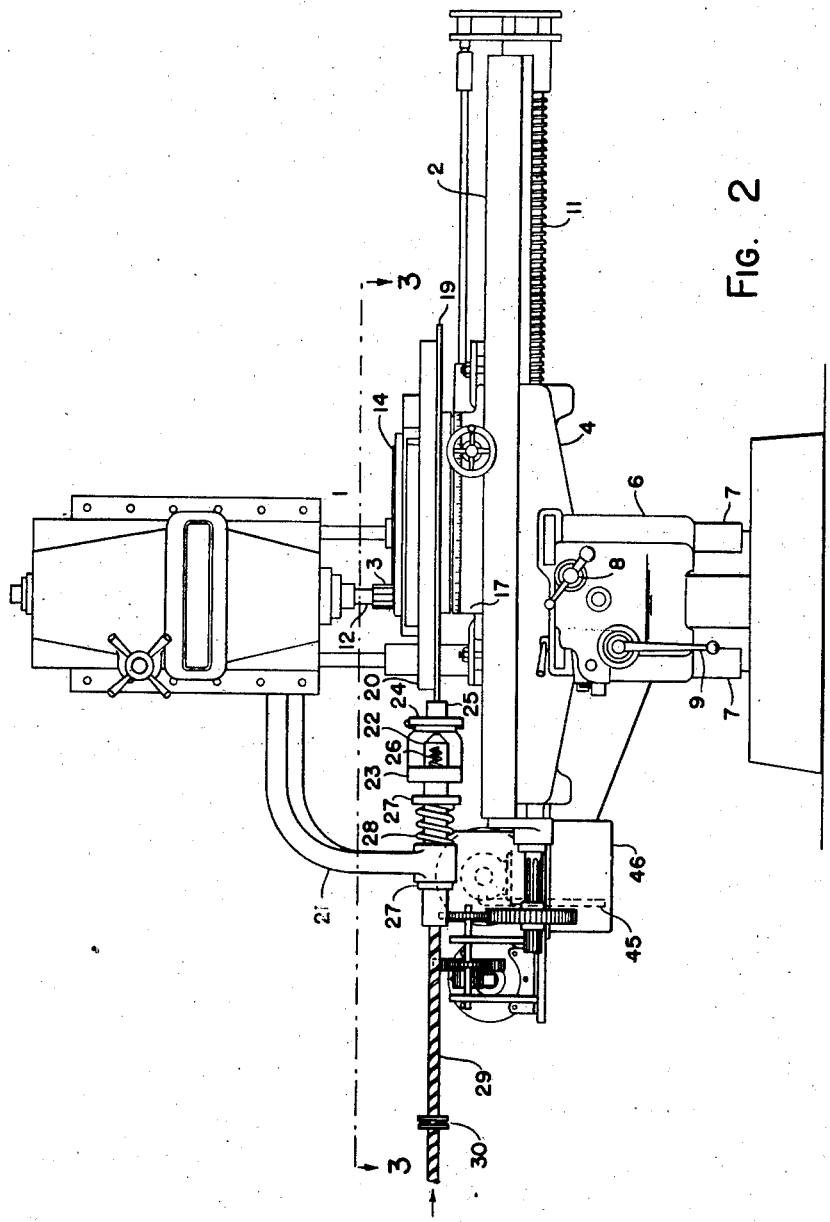

Referring now to Figs. 1, 2 and 3, I therein show a vertical milling machine having a column 1, a work table 2, and a rotatable form milling cutter 3. The work table 2 is carried in a saddle 4 mounted on horizontal guide ways 5 carried by a knee 6 which is supported in vertical guide ways 7 formed on the column 1. A micrometer hand wheel 8 is provided for positioning the saddle 4 along the guide ways 5. A similar hand wheel 9 is provided for positioning the knee 6 along the vertical guide ways 7. The work table 2 is mounted on a horizontal guideway 10 formed in the saddle 4 and is positionable relative thereto by a lead screw 11. The cutter 3 is secured to a spindle 12 rotated by a motor 13, which may be further adapted to position the work table 2 along one or more of the guideways as well known.

At 14 is shown a typical work piece consisting of a concave forging of more or less elliptical shape and in rough form having a raised blank face extending around its entire periphery. The machining operation I have chosen to illustrate my invention as controlling consists in forming a male flange face on this outer face. The cutter 3 is suitably shaped to relieve the outer edge of the flange, and by my invention the work piece is automatically moved relative to the cutter so that the latter accurately forms the outer profile of the raised portion of the flange.

The work piece 14 is shown as being secured to a fixture 15 by adjustable clamping means 16. Because of the nature of the machining operation to be performed the fixture 15 is mounted on a circular table 17 secured to the work table 2 and rotatable at desired speed by the motor 13 through suitable reducing gears and shafting (not shown). The machining of the work piece 14 is completed in one revolution of the circular table 17, during the revolution the work piece being moved relative to the cutter 3 to accurately profile the male flange by means now to be described.

The fixture 15 has a horizontally extending skirt 19 forming a cam or template, the contour of which is formed to produce the desired contour of the raised portion of the flange on the work piece 14. A raised barrier 20 is preferably employed to hold chips cut from the work piece from scattering.

Fastened to the column 1 is an arm 21 in which is journaled a nozzle 22. Secured to the nozzle is an extension 23 which pivotally supports a follower 24 having a projection 25 urged against the cam or template 19 by a spring 26. The nozzle 22 is preferably resiliently journaled in the arm 21 by means of spaced collars 27 and spring 28, which provide for lateral movements, thereby preventing injury to the nozzle in the event that the follower 24 is inadvertently jammed against it.

The nozzle 22 is connected to a suitable source of pressure fluid (not shown), such as compressed air, by a flexible tube 29 in which is inserted an orifice or other partial restriction 30. Normally therefore a jet of fluid is continuously discharged from the port 31 against the follower 24, which acts as a valve member for the port, its movements toward and away from the port governing the rate of discharge of fluid therefrom. That is to say, when the follower 24 is positioned to the left, or closer to the port 31, as shown in Fig. 3, the rate of discharge from the port is decreased, whereas when the follower 24 is positioned to the right, or away from the port, the rate of discharge from the nozzle increases. Such changes in the rate of discharge from the port effect corresponding changes in the pressure of the fluid within the nozzle, a decrease in the rate of discharge effecting an increase in the pressure of the fluid within the nozzle, whereas an increase in the rate of discharge effects a corresponding decrease in fluid pressure.

As the template 19 and the work piece 14 are rotated by the circular table 17 the follower 24 will be positioned toward and away from the port 31 in accordance with changes in the configuration of the template. Such positioning of the follower 24 effects changes in the pressure of the fluid within the nozzle 22. These pressure variations are effective for positioning the work table 2, to return the follower 24 to the normal distance from the port 31. Inasmuch as in the embodiment of my invention illustrated in Figs. 1, 2 and 3 the cutter 3 is stationary, as is also the nozzle 22, it follows that if the work table 2 is positioned to maintain a normal distance between the follower 24 and port 31 the work piece 14 will upon completion of the machining operation have a configuration determined by the configuration of the template 19.

Inasmuch as the circular table 17 rotates, whereas the work piece may have a shape other than circular, and furthermore may not be concentrically located on the table with respect to the center of rotation thereof, it follows that the periphery of the work piece will not be a duplicate of that of the template 19. The proper contour of the template to give the desired shape to the work piece may be determined, as evident to those skilled in the art, by calculation or graphically.

The pattern or template has a shape corresponding to the desired path of movement of the tool to produce the desired finished work piece. By "corresponding" is meant that not only is the pattern or template the same shape as the desired work piece, either in greater or smaller proportions thereto; but also that the pattern or template is in any desired distorted shape to compensate for characteristics of the machine. While the pattern or template must correspond to the desired work piece, it is not necessarily identical in contour, and, therefore, the term "correspond" implies that the pattern or template is purposely designed to result in the desired contour of the work piece to be produced.

Changes in the shape and size of the projection 25 relative to that of the cutter 3 will also modify the shape of the template 19 necessary to produce a desired shape of the work piece 14. In some instances the design of the template 19 is somewhat simplified by having the projection 25 the same shape and size as the cutter 3, and therefore I usually find it desirable to employ the construction shown in Fig. 3. However, in some instances it may be preferable to employ the construction shown in Fig. 4. As shown, the follower 24 and projection 25 are eliminated. The nozzle 22 is located immediately adjacent the template 19 so that the template itself acts as the valve member for the port 31. Other than this the construction and operation will be as described with reference to Fig. 3.

Pressures established within the nozzle 22 are transmitted through a flexible tube 33 to a relay within a protecting housing 33A and shown in cross section in Fig. 5. The tube 33 connects with the interior of a bellows 32 secured to a wall of the housing 33A. The force produced by the fluid pressure acts against the lower or free head of the bellows and is opposed by the inherent resiliency of the bellows and an elliptical spring 35. The free head of the bellows will therefore assume a position corresponding to the magnitude of the fluid pressure. Movements of the lower head of the bellows position a movable valve member 36A of a hydraulic pilot valve 36 to control the flow of hydraulic fluid to and from a servo-motor 38 having a piston 37 operating the lead screw 11 through a rack 39, spur gears 40, and a final gear 41 which is splined to the lead screw to permit relative axial movement.

Assuming now that the normal distance exists between the port 31 and follower 24 a definite pressure will exist within the bellows 32, which by adjustment of the spring 35 will cause the valve member 36A to assume a neutral position, i. e. a position in which no hydraulic fluid passes between the pilot valve 36 and servo motor 38. If now the follower 24 moves toward the port 31 the pressure within the bellows 32 will increase, causing a downward positioning of the valve member 36A, a passage of hydraulic fluid between the pilot valve 36 and servo-motor 38 causing the piston 37 to move the work table 2 in a direction to restore the port 31 and follower 24 to normal distance. Upon a decrease in fluid pressure within the bellows 32 the servo-motor 38 will position the work table 2 in opposite direction, thereby positioning the follower 24 toward the port 22 until normal distance is restored. It is apparent that by proper shaping of the template 19 the follower 24 may be moved toward and away from the port 31 as the circular table 17 revolves to effect corresponding movements of the work table 2 relative to the cutter 3 to effect accurate shaping of the work piece 14.

Hydraulic fluid, such as oil, used in positioning the piston 37 of the servo-motor 38 may be pumped by any suitable means, such as the oil pump 43 driven by a motor 44. The pump 43 is provided with an inlet pipe 45 extending into an oil reservoir 46, and a discharge pipe 47 which is connected to the inlet port 60 of the pilot valve 36. Hydraulic fluid returned from the servo-motor 38 to the pilot valve is passed to the reservoir 46 through exhaust pipes 48 and 49.

The pilot valve 36 is provided with outlet ports 50 and 51. The former being in communication with one side of the piston 37 through a pipe 52, and the latter in communication with the opposite side of the piston through a pipe 53. Downward positioning of the valve member 36A connects the outlet port 50 to the pump 43 and the outlet port 51 with the exhaust pipe 49, whereas upward positioning of the valve member connects the outlet pipe 51 with the pump 43 and the outlet port 50 with the exhaust port 48.

The movable valve member 36A is provided with sealing glands 55 and 56, which are of substantially the same diameter as the passageway 57 extending longitudinally through the pilot valve. Oil from the pump 43 is admitted under pressure through pipe 47 to the inlet port 60 which is in the form of an annular chamber. The port 60 is in communication with the passageway 57 through a plurality of equally spaced upper V-ports 61 and a similar plurality of lower V-ports 62. With the valve member 36A in the neutral position, that is in the position occupied when the follower 24 is the normal distance from the port 31, then a land 64 restricts communication between V-ports 62 and outlet port 50. Likewise a land 65 restricts communication between V-ports 62 and outlet port 51. When, however, the valve member 36A is positioned downwardly, for example, the V-ports 61 are partially uncovered so that communication is established between the inlet pipe 47 and the outlet port 50. The area of the uncovered V-ports 61 depends upon the displacement of the valve member 36A from the neutral position, and accordingly the flow of oil from the inlet pipe 47 to the outlet port 50 will vary depending upon the displacement of the valve member. Conversely upon upward positioning of the valve member 36A from the neutral position a portion of the V-ports 62 will be uncovered, thereby permitting a proportionate flow of pressure fluid from the inlet pipe 47 to the outlet port 51.

Also carried by the valve member 36A are lands 66 and 67 cooperating with spaced V-ports 68 and 69 respectively to control the flow of pressure fluid from the outlet port 50 to the exhaust pipe 48, and from the outlet port 51 to the exhaust pipe 49. It will be noted that upon downward positioning of the valve member 36A, which establishes communication between the inlet pipe 47 and outlet port 50, communication is likewise established between the outlet port 51 and exhaust pipe 49. Pressure fluid is thus transmitted through pipe 52 to one side of the piston 37 and simultaneously withdrawn from the opposite side of the piston through pipe 53 to exhaust port 49. Upward positioning of the valve member 36A from the neutral position results in opposite action, in this instance pressure fluid being transmitted from inlet pipe 47, pipe 53, to one side of piston 37. Pressure fluid is simultaneously withdrawn from the opposite side of piston 37 through pipe 52 to outlet port 50, and thence to exhaust pipe 48. It will be noted that whenever the valve member 36A is in other than the neutral position, the piston 37 will continue to move in predetermined direction. Accordingly, upon the follower 24 being in other than the normal position, the work table 2, and the work piece 14 will be positioned until normal distance is restored. It is further evident that the rate at which the table 2 will be positioned will be dependent upon the amount of displacement of the follower 24 from the normal position relative to the port 31. If a sudden change in contour of template 19 occurs, the table 2 will be rapidly positioned but upon a relatively slow rate of change in the contour of the template a correspondingly slow change in position of the table 2 will occur. Thus the pilot valve 36 will cause the work piece to be accurately positioned relative to the cutter without overshooting or hunting.

Preferably the sealing lands 55 and 56 are of substantially the same diameter as the passageway 57, thereby preventing material leakage of oil. The lands 64, 65, 66 and 67 are however of a somewhat less diameter than the passageway 57, thereby preventing undue friction and permitting the member 36A to be freely positioned in the passageway. The pressure transmitted from the inlet pipe 47 to outlet ports 50 and 51, with the member 36A in neutral position because the lands 64 and 65 may be of somewhat less diameter than the passageway, will not affect the accuracy with which the piston 37 is positioned for such pressures will be equal and act in opposite direction on the piston 37. The system will stabilize with the pilot slightly off center to balance total pressures rather than unit pressures as would be the case with a construction where the piston rod extends through both ends of the cylinder. It will further be noted that the flows into and out of the passageway 57 are radial, so that there is no reaction on the member 36A because of the velocity of flow into and out of the passageway. Furthermore, the pressures are axially balanced due to the equal areas of lands 64, 65, 66 and 67 so that no reaction exists due to the resultant of the oil pressures acting in an upward or downward direction.

Figure 6:
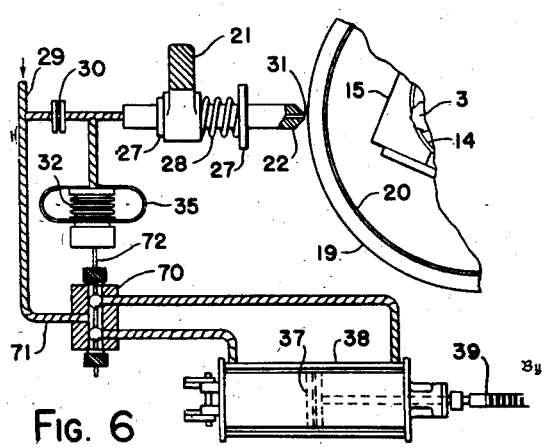
Fig. 6 illustrates diagrammatically a modified form of fluid pressure system.

While in general I have found it preferable to operate the table 2 or comparable device indirectly from the fluid pressures established within the nozzle 22 by means of a hydraulic relay, in some instances where a relatively light machining operation is being performed, or an extreme degree of accuracy is not required, I have found it possible to dispense with the hydraulic relay system and employ in its stead a pneumatic relay system as shown in Fig. 6.

Therein I show fluid pressure, such as compressed air, transmitted from the pipe 29 ahead of the orifice 30 to a pilot valve 70 by a pipe 71. The pilot 70 shown in cross-section may be so constructed that downward positioning of the movable valve member 72 permits pressure fluid to be transmitted to one side of the piston 37 and simultaneously exhausts pressure fluid from the opposite side of the piston 37. Conversely upon upward positioning of the member 72 reverse operation of the piston 37 will occur. When the normal distance exists between port 31 and template 19 the member 72 is positioned so that the lands thereon are adjacent the outlet ports leading to the servo-motor 38.

Figure 8:
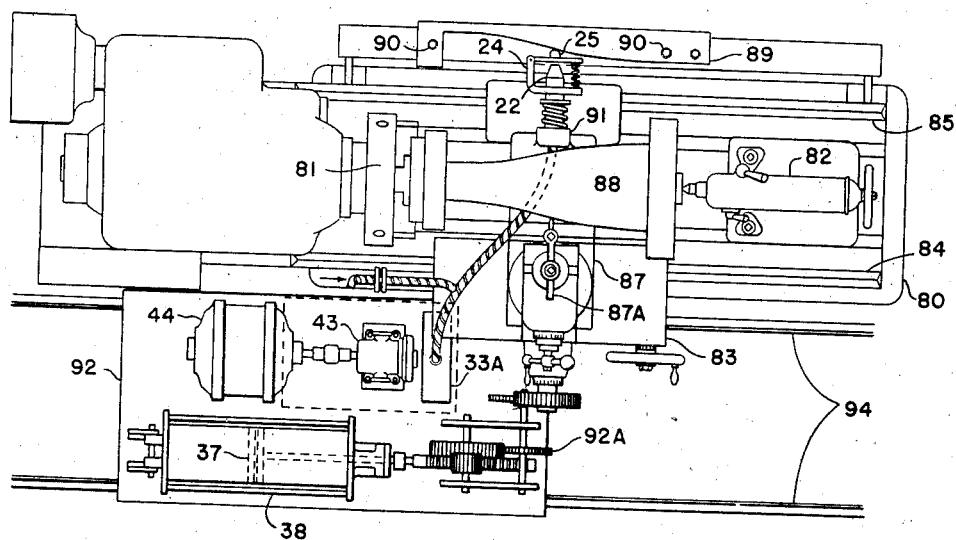
Fig. 7 is a side elevation and Fig. 8 is a plan view of an engine lathe showing the application of my invention thereto.
Figure 7:
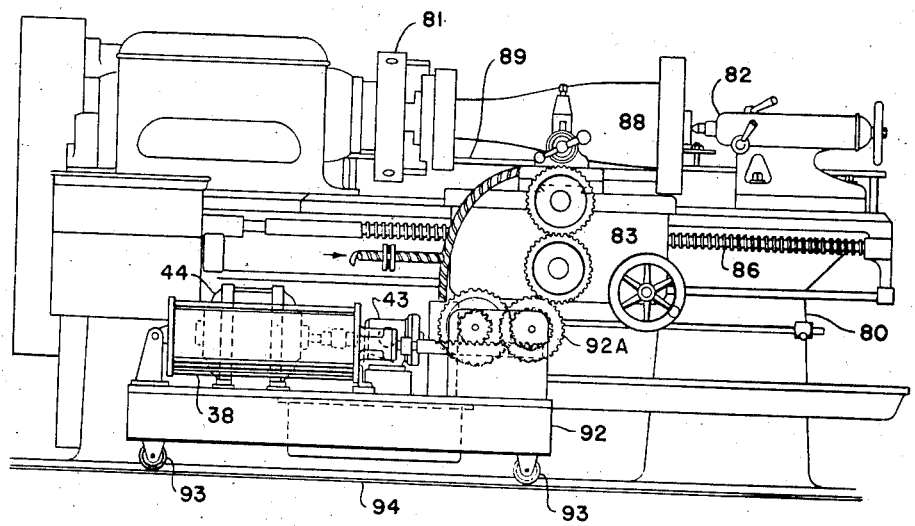

In the embodiments of my invention so far described the work piece has been moved, whereas the cutter or tool has remained stationary. In Figs. 7 and 8 I disclose a further embodiment of my invention in conjunction with an engine lathe wherein the work piece remains in fixed position and the tool, or cutter, is moved. It will be evident to those skilled in the art however that in all of the embodiments it is the relative movement between the work piece and the tool which is of importance and which is controlled by my invention.

Referring to Figs. 7 and 8 I therein show a typical engine lathe having a bed 80, rotatable face plate 81, and tail stock 82. It is further provided with a carriage 83 movable on guideways 84, 85 longitudinally along the bed 80. Normally the longitudinal movement of the carriage is controlled by a lead screw 86, which may be driven by any suitable source of power (not shown) at any desired speed by means of suitable reducing gears (not shown).

Mounted on the carriage 83 is a cross-slide 87 carrying a tool holder and tool 87A which by way of example I have shown as forming a work piece 88 into general irregular conical form. In the embodiment of my invention shown the transverse motion of the cross-slide 87 is automatically controlled so that the work piece 88 is formed to correspond in shape to a template 89, which is secured to the bed 80 of the lathe by suitable clamping means 90.

The system for positioning the tool 87A relative to the work piece 88 is substantially the same as that described for positioning the cutter 3 relative to the work piece 14. Nozzle 22 is resiliently mounted in an arm 91 secured to the cross-slide 87. The projection 25 of the follower 24 bears against the edge of the template 89, which has a contour to which the work piece 88 is to be shaped. Pressures established in the nozzle 22 are transmitted to the relay 33A, which in turn acts to control the positioning of the piston 37 in servo-motor 38. Positioning of the piston 37 controls the transverse positioning of the tool 87 through a rack 39 and suitable gears 92A.

In order that the servo-motor 38, relay 33A and associated apparatus may move with the cross-slide 87 longitudinally along the lathe they are shown mounted on a truck 92 provided with flanged wheels 93 riding on rails 94. The truck 92 is secured to the carriage 83 so that the servo-motor is maintained at proper operating distance from the cross-slide 87.

In operation, as the template 89 changes in shape corresponding variations in pressure within the nozzle 22 occur, which effect transverse operation of the cross-slide 87 to maintain the follower 24 at normal distance from the port 31. Simultaneously, the tool 87 is moved transversely so that the work piece 88 assumes the same shape as the template 89. The cross-slide 87 is moved longitudinally by the feed screw 86 and carriage 83 at desired speed by any suitable source of power as heretofore described.

Figure 10:
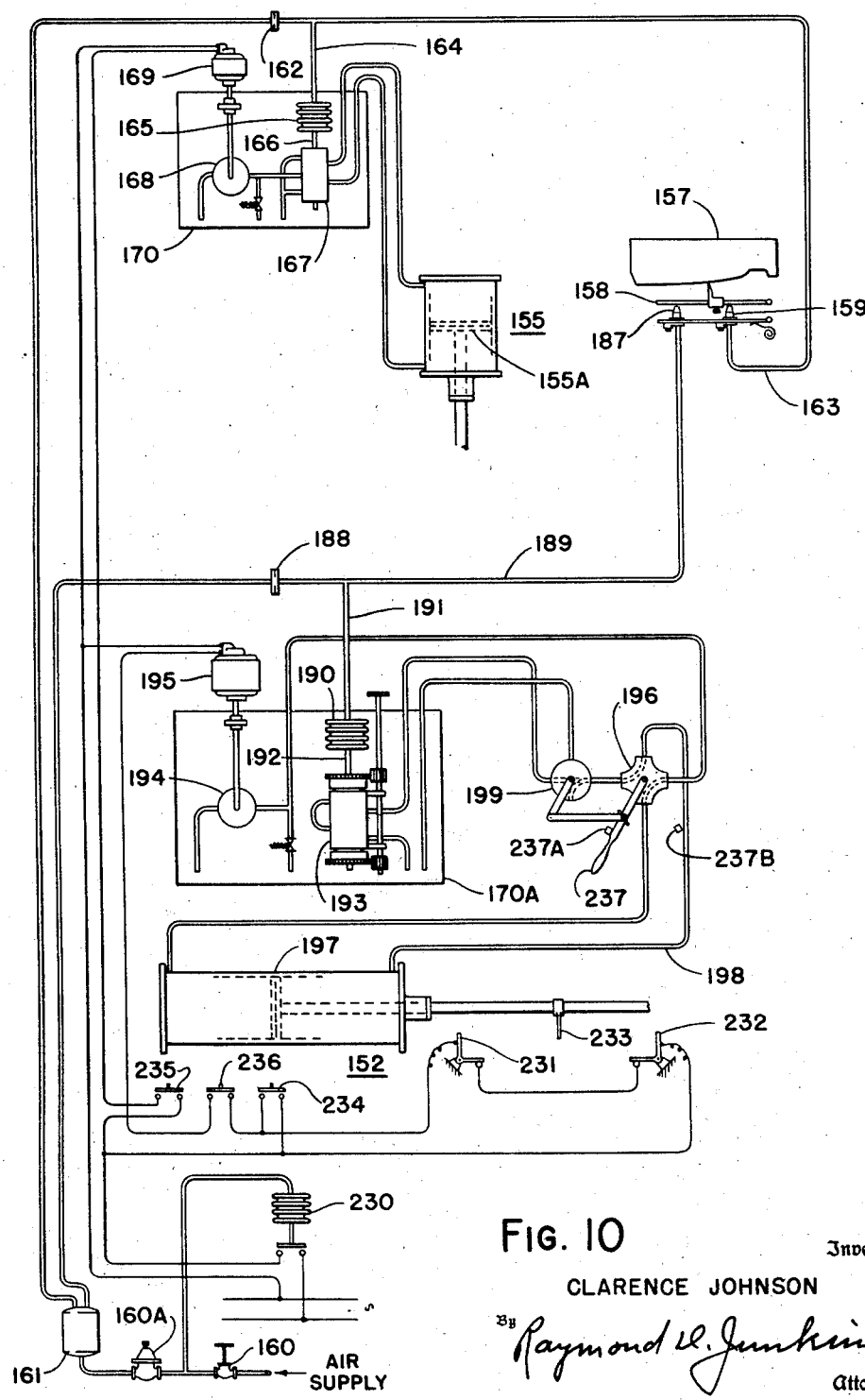
Fig. 10 illustrates diagrammatically the various circuits employed in the embodiment of my invention shown in Fig. 10.

In Fig. 9, I show a modified form of my invention applied to an engine lathe 150 similar to the lathe illustrated in Figs. 7 and 8. In Fig. 10 the control and operating circuits for the embodiment of my invention illustrated in Fig. 9 are shown diagrammatically.

Referring to Figs. 9 and 10 the carriage 151 is arranged to be positioned longitudinally along the lathe 150 by a servo-motor 152 having a piston rod 153 operatively connected to the carriage. A cross-slide 154 mounted on the carriage 151 is positioned transversely by means of a similar servo-motor 155 secured to and movable with the carriage 151. In the embodiment of my invention illustrated in Fig. 9 the tool 154A carried by the cross-slide 154 is positioned to form a work piece 156 to conform with the shape of a pattern or template 157.

As the carriage 151 is positioned along the lathe by the servo-motor 152 transverse changes in the profile of the pattern 157 effect corresponding changes in the relative positions of a pivoted follower or feeler 158 and nozzle 159. The nozzle 159 is supplied with fluid under pressure, such as compressed air, from a source (not shown), through a shut-off valve 160, a reducing valve 160A, a stabilizing volume tank 161 and a suitable resistance such as an orifice 162. As in the embodiments of my invention previously described, compressed air is continuously discharged through the nozzle 159 to the atmosphere and changes in the position of the feeler 158 relative to the nozzle 159 cause changes in the pressure within the pipe 163 connecting the nozzle 159 to the orifice 162. Variations in pressure within the pipe 163 are transmitted through a pipe 164 to an expansible contractible chamber such as a bellows 165 positioning the movable valve member 166 of a pilot valve 167. The pilot valve 167 controls the flow of hydraulic fluid to and from a servo-motor 155.

When the profile of the pattern 157 is parallel to the line of travel of the carriage 151 a certain distance will exist between the nozzle 159 and feeler 158. When this distance, which for convenience I call the "normal distance," exists a sufficient pressure is maintained within the bellows 165 to hold the movable valve member 166 in a neutral position so that hydraulic fluid is transmitted neither to nor from the servo-motor 155 and the cross-slide 154 remains stationary relative to the carriage 151. Assuming however by way of example that the feeler 158 moves toward the nozzle 159, the pressure within the pipe 163 and that transmitted to the bellows 165 will increase proportionately. Such increase in pressure will cause the servo-motor 155 to position the cross-slide 154 so that the nozzle 159 carried thereby moves away from the feeler 158 until normal distance is restored therebetween. The tool 154A also carried by the cross-slide 154 will be moved relative to the work piece 156 a corresponding amount, and hence the latter will be formed to the exact configuration of the pattern or template 157. Hydraulic fluid, such as oil, is supplied the pilot 167 by means of a pump 168 driven by a motor 169.

In Fig. 11 I show the pilot valve 167 in cross section and to larger size. A body member 350 has a cylindrical bore in which are disposed sleeves 351, 352 and bearing members 353, 354. Caps 355 and 356 screwed to the body 350 hold the sleeves and bearing members in position.

The movable valve member 166, positioned by bellows 165, is provided with lands 357, 358, 359 and 360 of slightly less diameter than the bore in sleeves 351, 352. Lands 358, 359 control the flow of hydraulic fluid from an inlet port 361 to outlet ports 362, 363 respectively connected to servo-motor 155. Lands 357, 360 control the flow of hydraulic fluid from outlet ports 362, 363 to waste ports 364, 365 respectively. Downward movement of the valve member 166 from the neutral position in which it is shown opens inlet port 361 to outlet port 362 and permits the passage of hydraulic fluid from the pump 168 to the servo-motor 155. Such movement also opens outlet port 363 to waste port 365 so that as a result of such downward positioning of the valve member 166 hydraulic fluid is admitted to servo-motor 155 on one side of piston 155A and discharged from the other side. Conversely, upward positioning of the movable valve member 166 opens outlet port 363 to inlet port 361, and simultaneously opens outlet port 362 to exhaust port 364. Thus downward positioning of the movable valve member 166 from the neutral position effects operation of piston 155A in one direction, whereas upward positioning effects operation of the piston 155A in the opposite direction.

Sleeve 351 which is identical with sleeve 352 is shown to larger size in Fig. 12. The inlet port 361 consists of a slot 366, whereas the outlet port consists of a plurality of circumferentially spaced holes 367. The waste port is similar to the inlet port 366 and comprises a slot 368. The sleeve is also provided with spaced collars 369, 370 serving to properly align the sleeve in the housing 350 and acting to separate the inlet port from the outlet port and the outlet port from the waste port.

In Fig. 13 I show an end view of the bearing member 353, the bearing member 354 being identical therewith. As shown, the end of bearing member 353 adjacent the sleeve 351 is conically recessed and provided with a radial slot 371 which acts to prevent land 357 adhering to the bearing member if positioned upwardly thereagainst.

The pilot valve 167 is inherently stable as a displacement of the valve member 166 from neutral position with consequent flow of hydraulic fluid produces a slight reaction tending to return the movable valve member to the neutral position. That such reaction exists will be evident from an inspection of the construction shown in Fig. 11 for upon a displacement of the member 166 from neutral position the sole unbalanced force is that in the waste port 364 or 365. This stabilizing reaction may be brought to any value desired by proper design of the waste ports. Also by having the valve member 166 journaled in bearing members 353, 354 it is possible to have the lands 357, 358, 359 and 360 of slightly less diameter than the bore through sleeves 351 and 352, thereby reducing friction to a minimum. Further, to reduce friction the sections of the movable valve member 166, journaled in bearing members 353 and 354, are provided with a plurality of grooves 372, thereby preventing pressure building up on one side of the valve member and producing lateral thrust. Such grooves also reduce the leakage which otherwise would exist between the interior and exterior of the pilot valve.

In mechanisms of the type described, it is desirable to modify the rate of relative movement of tool and work piece in one direction whenever a relative movement of the tool and work piece in a second direction is required. Thus in the embodiment of my invention illustrated in Figs. 9 and 10 upon any change in shape of the pattern 157 requiring a transverse movement of the tool 154A the rate of travel of the carriage 151 along the lathe should be decreased so that the shape of the work piece 156 will closely conform to the shape of the pattern. To accomplish this I show the servo-motor 152 controlled by a control couple comprising the feeler 158 and a nozzle 187. So long as the profile of the pattern 157 is parallel to the line of travel of the carriage 151 the normal distance is maintained between the feeler 158 and nozzle 187 so that the servo-motor 152 moves the carriage 151 at any desired maximum rate of speed. However, upon a change in the profile of the pattern 157 the feeler 158 will move toward or away from the nozzle 187, thereby changing the loading pressure established by the latter and acting to slow down the rate of travel of the carriage 151. Thus it may be said that the control couple comprising the feeler 158 and nozzle 187 acts to limit the maximum departure of the work piece 156 from the shape of the pattern 157. Upon a predetermined departure of the relative position of the feeler 158 and nozzle 187 from normal the system disclosed will stop the carriage 151, thereby permitting the tool 154A to be positioned transversely of the axis of the lathe until such normal is reestablished. Preferably and by means hereinafter to be described, the relative positions of the nozzles 159 and 187 are adjustable so that the maximum tolerance between the shape of the work piece 156 and pattern 157 may be brought within any desired limits. Thus the positioning of the nozzle 187 to the left, as shown in Fig. 9, will cause a greater change in air loading pressure for a given change in the profile of pattern 157, and thereby cause a greater change in the rate of travel of the carriage 151.

Referring now particularly to Fig. 10, compressed air is supplied to nozzle 187 through an orifice 188 and pipe 189. Variations in pressure within the pipe 189 caused by changes in the relative positions of feeler 158 and nozzle 187 are transmitted to an expansible contractible bellows 190 through the pipe 191. Changes in pressure within the bellows 190 from that existing when the feeler 158 is the normal distance away from the nozzle 187 acts to position a valve member 192 of a pilot valve 193. The pilot valve 193 may be considered as a variable fluid resistance which acts to increase the resistance to fluid flow upon movement of the valve member 192 upwardly or downwardly from that position existing when the normal pressure is effective within the bellows 190.

The servo-motor 152 is supplied with oil under pressure from a pump 194 driven by a motor 195. Conveniently the motor 194, pilot valve 193 and associated apparatus may be mounted upon and within a housing 170A. This apparatus forms a power unit.

The oil after leaving the pump 194 passes through a four-way valve 196, and thence to the servo-motor 152 on one side of the piston 197. As the piston 197 is positioned to the right, as shown in Fig. 10, by the oil from the pump 194, oil is discharged from the servo-motor 152 through a conduit 198, the four-way valve 196, thence through a three-way valve 199 to the pilot valve or variable resistance 193, whence it is discharged into the reservoir formed by the housing 170A. It will be noted that the full pressure developed by the pump 194 is effective for positioning the piston 197. The rate of travel thereof and accordingly of the carriage 151 is varied, however, by variably throttling the discharge of oil by means of the pilot valve or fluid resistance 193.

In Figs. 14 and 15 I show the pilot valve 193 in greater detail and to larger size. A housing 200 has a longitudinal passageway in which are disposed identical sleeves 201, 202 urged by a spring 203 against bearing members 204 and 205. Caps 206, 207 screw-threaded to the body 193 take the end thrust of the bearing members. Oil exhausted from the servo-motor 152 enters an initial inlet port 208, passes axially upwardly through an intermediate outlet port 209, whence it is transmitted to an intermediate inlet port 210 through a suitable connection (diagrammatically shown) 211, and thence axially downwardly to a final outlet port 212 from which it is exhausted into the oil reservoir.

Within the passageway is disposed the movable valve member 192 having lands 213, 214, 215 and 216. In the position shown the resistance to fluid flow through the port 209 is at a minimum, as is that through the port 212. Accordingly, the piston 197 and carriage 151 will be positioned at maximum speed. Upon the valve member 192 moving downwardly, due to an increase in pressure within the bellows 190, the resistance to fluid flow through the outlet port 209 will increase inasmuch as the land 213 will partially close it. This increase in resistance will decrease the flow of fluid from the servomotor 152, thereby decreasing the rate of travel of the piston 197. If the pressure within the bellows 190 increases sufficiently so that the land 213 completely covers the port 209 the piston 197 will completely stop. Likewise upward movement of the movable valve member 192 from the position shown will cause the land 216 to partially or wholly cover the port 212, thereby increasing the resistance to fluid flow and slowing down or stopping the piston 197. It is apparent, therefore, that when the pressure within the bellows 190 is that produced when the feeler 158 is a normal distance from the nozzle 187, the piston 197 will travel at maximum speed, and an increase or decrease in fluid pressure within the bellows 190 caused by a movement of the feeler 158 toward or away from the nozzle 187 will cause the piston 197 to slow down or completely stop if such movement is of sufficient magnitude.

The inlet ports 208 and 210 comprise a plurality of circumferentially spaced holes in the sleeves 201 and 202 respectively. The sleeves are recessed adjacent these ports so that oil flows into the passageway formed by the sleeves through all of the holes simultaneously. The outlet ports 209, 212 are formed by end slots in the sleeves 201 and 202. Bearing members 204, 205 are provided with one or more slots 204A, 205A which act to equalize the pressures on opposite sides of lands 213, 216. Slots 204A, 205A having a small area offer a high resistance to the flow of oil.

As will be appreciated by those familiar with the art, it is desirable to have the maximum rate of travel of the carriage 151 adjustable, depending for example upon the contour of the pattern or template 157, the character of the material being machined, etc. Accordingly, I provide the pilot valve 193 with a means for adjusting the minimum resistance to fluid flow. This I accomplish by providing the caps 206 and 207 with opposite threads, so that as they are rotated in the same direction one will move downwardly and the other upwardly. Such positioning will move the bearing members 204, 205 toward or away from each other, causing sleeve members 201 and 202 to likewise move toward or away from each other. Such positioning of the sleeve members will cause the movable valve member 192 to increase or decrease the effective free area of the ports 209, 212 when in the neutral position or that position obtaining when normal distance exists between the nozzle 187 and feeler 158. Conveniently such adjustment may be obtained by providing the caps 206 and 207 with gears 220, 221 meshing with pinions 222, 223 manually rotatable by means of knob 224.

In the embodiment of my invention shown in Figs. 9 and 10, I provide various safety and other devices for facilitating operation. Thus I show connected in the power supply to motors 169, 195 an air pressure failure switch 230 which prevents their operation unless air pressure is available for the nozzles 159, 187. Also shown connected in circuit with motor 195 are limit switches 231 and 232 arranged to be operated by a projection 233 carried by the piston rod of servo-motor 152. The switches may be adjusted so that upon the tool reaching either end of pattern 157 motor 195 is deenergized, thereby preventing further travel of the carriage which might result in damage to the tool or other parts of the lathe. A push button station 234 allows the operator to reenergize motor 195 after the power supply thereto is broken either at switch 231 or 232. Also connected in circuit with motors 169 and 195 are manually operable push buttons 235 and 236 respectively, which affords the operator instantaneous control over the transverse or longitudinal feed of the tool 154A.

As shown in Fig. 9 the tool 154A is arranged to traverse the work piece 156 from left to right. Upon the tool reaching the end of the work piece motor 195 will be deenergized as heretofore described by switch 232 opening. The tool 154A can then be moved transversely away from the work piece 156 by the nozzle 159 and feeler 158 being manually moved relative to each other, thereby causing the servo-motor 155 to position the cross-slide in proper direction. In order that the tool 154A may be returned to the left end of its travel I provide a hand operable lever 237 for simultaneously operating the four-way valve 196 and three-way valve 199. Thus upon the tool 154A reaching the right end of its travel, switch 231 will open, deenergizing motor 195. The operator would then relatively move feeler 158 and nozzle 159 so that the tool is positioned away from the work. Lever 237 would then be shifted from stop 237A to 237B and simultaneously the circuit to motor 195 closed by means of push button 234. Shifting of lever 237, as shown in Fig. 10, causes pipe 198 to be connected to pump 194 while the connection to servo-motor 152 at the opposite side of piston 197 is connected directly to the oil reservoir formed by housing 170A through three-way valve 199. As full pressure developed by the pump 194 is available for positioning the piston 197 in reverse direction, and by virtue of the fact that the pilot valve 193 is by-passed, the reverse traverse will be made at a high speed.

In the event that it is desired to have the tool 154A feed in the reverse direction, that is from left to right, then by disconnecting the lever 237 at 237C from the three-way valve 199 so that movement of the lever adjusts only the four-way valves 196, then the pump 194 will deliver pressure fluid through the pipe 198 to the servo-motor 152, whereas the cylinder of servo-motor 152 on the opposite side of piston 197 will be connected to the pilot valve 193. Accordingly, with such an arrangement the operation will be as previously described, except that the tool 154A will feed from right to left as viewed in Fig. 9 rather than from left to right.

This application is a division of my copending application Serial No. 384,375 filed in the United States Patent Office on March 20, 1941, and now Patent No. 2,372,426, granted March 27, 1945. Certain features of my invention, disclosed but not claimed herein, are disclosed and claimed in my copending divisional application Serial No. 642,175 filed January 19, 1946.

While in accordance with the Patent Statutes I have described certain embodiments of my invention it is evident that such embodiments may be modified in many ways without departing from the spirit and scope of the invention. Such embodiments of my invention as I have chosen to describe should therefore be taken as merely illustrative and not as limiting.

What I claim as new, and desire to secure by Letters Patent of the United States, is:

1. In a machine tool control, a tracer mechanism for producing a control effect corresponding to the profile of a pattern, an expandable contractible chamber to which the control effect is applied and having a movable portion, and a pilot valve positioned by said movable portion and controlling a fluid flow, said pilot valve so constructed that when the tracer is in a predetermined relation to the pattern profile a predetermined fluid flow exists through the pilot valve and when the tracer and pattern profile depart in either direction from predetermined relation said fluid flow is gradually diminished as distinguished from known pilot valves which in neutral position inhibit the flow of fluid therethrough and upon departure from neutral in either direction allow the fluid flow or pressure to increase to a maximum.

2. The combination of claim 1 wherein the said pilot valve includes means for varying the rate of fluid flow therethrough for said predetermined relation.

3. The combination of claim 1 wherein the said pilot valve is provided with a plurality of concentric grooves over its bearing surfaces to prevent lateral thrust due to fluid pressure.

4. In a material forming machine, a tracer mechanism for producing a fluid pressure control effect corresponding to a pattern, means responsive to said control effect, and a pilot valve positioned by said means and controlling a fluid flow, said pilot valve so constructed that when the tracer is in a predetermined relation to the pattern profile a predetermined fluid flow exists through the pilot valve and when the tracer and pattern profile depart in either direction from predetermined relation said fluid flow is gradually diminished as distinguished from known pilot valves which in neutral position inhibit the flow of fluid therethrough and upon departure from neutral in either direction allow the fluid flow or pressure to increase to a maximum and wherein the said pilot valve is provided with a plurality of concentric grooves over its bearing surfaces to prevent lateral thrust due to fluid pressure.

5. In a machine tool control, a tracer mechanism for producing a pneumatic pressure effect corresponding to a pattern, means sensitive to said pressure effect and having a movable portion, and a pilot valve positioned by said movable portion and controlling a fluid flow, said pilot valve so constructed that when the tracer is in a predetermined relation to the pattern profile a predetermined fluid flow exists through the pilot valve and when the pattern and tracer profile depart in either direction from predetermined relation said fluid flow is gradually diminished.

6. The combination of claim 5 wherein the said pilot valve includes manually positionable means for varying the basic rate of fluid flow through the pilot valve for the said predetermined relation.

7. Control apparatus for relatively moving the tool and work piece of a material forming or working machine comprising, pattern controlled pneumatic pressure means, separate hydraulic motive means for relatively positioning the tool and work piece along two angularly related paths respectively, the speed of movement of the motive means causing movement along one of the two paths being dependent upon the rate of hydraulic fluid passage to or from the said motive means, a variable fluid resistance regulating the rate of hydraulic fluid passage mentioned, and a fluid pilot valve controlling the other motive means, the resistance and the pilot valve jointly controlled by said pneumatic pressure means.

CLARENCE JOHNSON.